United States Patent [19]

Compton

[11] Patent Number: 5,001,579
[45] Date of Patent: Mar. 19, 1991

[54] METHOD AND APPARATUS FOR CENTERING A TRANSDUCER OVER A RECORDED TRACK ON A ROTARY STORAGE MEDIUM

[75] Inventor: John T. Compton, Leroy, N.Y.

[73] Assignee: Eastman Kodak Company, Rochester, N.Y.

[21] Appl. No.: 200,086

[22] Filed: May 27, 1988

[51] Int. Cl.$^5$ .............................................. G11B 5/596
[52] U.S. Cl. .................................. 360/77.06; 360/109; 360/78.04
[58] Field of Search ................ 360/77.04, 77.06, 78.04, 360/78.08, 78.13, 77.02, 77.05, 77.07–77.11, 78.15, 109

[56] References Cited

U.S. PATENT DOCUMENTS

| | | |
|---|---|---|
| 4,197,564 | 4/1980 | Ravizza . |
| 4,204,234 | 5/1980 | Noble .............................. 360/77.04 |
| 4,210,943 | 7/1980 | Nakamura et al. . |
| 4,229,773 | 10/1980 | Skamoto . |
| 4,270,073 | 5/1981 | Harmon . |
| 4,286,296 | 8/1981 | Cunningham . |
| 4,419,701 | 12/1983 | Harrison et al. . |
| 4,422,112 | 12/1983 | Tanaka . |
| 4,485,418 | 11/1984 | Bremmer . |
| 4,536,806 | 8/1985 | Louth . |
| 4,544,969 | 10/1985 | Pointon . |
| 4,551,777 | 11/1985 | Saito et al. . |
| 4,559,570 | 12/1985 | Schwartz . |
| 4,575,775 | 3/1986 | Albrecht . |
| 4,577,244 | 3/1986 | El-Sadi . |
| 4,581,663 | 4/1986 | Tanaka . |
| 4,616,276 | 10/1986 | Workman . |
| 4,633,344 | 12/1986 | Jeffers . |
| 4,642,541 | 2/1987 | El-Sadi . |
| 4,647,992 | 3/1987 | Vinal . |
| 4,677,506 | 6/1987 | Kaneko . |
| 4,679,103 | 7/1987 | Workman . |
| 4,689,700 | 8/1987 | Miyake et al. ................... 360/78.04 |
| 4,691,252 | 9/1987 | Okada et al. . |
| 4,698,702 | 10/1987 | Miyake . |
| 4,701,815 | 10/1987 | Yada et al. . |
| 4,710,832 | 12/1987 | Itoh ................................... 360/78.04 |

OTHER PUBLICATIONS

U.S. application Ser. No. 924,541, filed Oct. 29, 1986.

Primary Examiner—Aristotelis M. Psitos
Assistant Examiner—Steven R. Garland
Attorney, Agent, or Firm—David M. Woods

[57] ABSTRACT

By waiting until an amplitude signal from a recorded track undergoes a predetermined change from an observed maximum signal level, the maximum level is "validated" as a signal peak representative of track center. The amplitude signal is generated as a transducer moves radially across a rotating disk and crosses one or more concentric information-bearing tracks. The amplitude signal is sampled at regular intervals and processed by a software low pass filter. Succeeding filtered samples are compared to find a signal maximum. The maximum level is then retained and each new sample is subtracted from the retained level. When the signal difference exceeds an excursion threshold, the signal maximum is "validated" and the head is moved to track center.

15 Claims, 5 Drawing Sheets

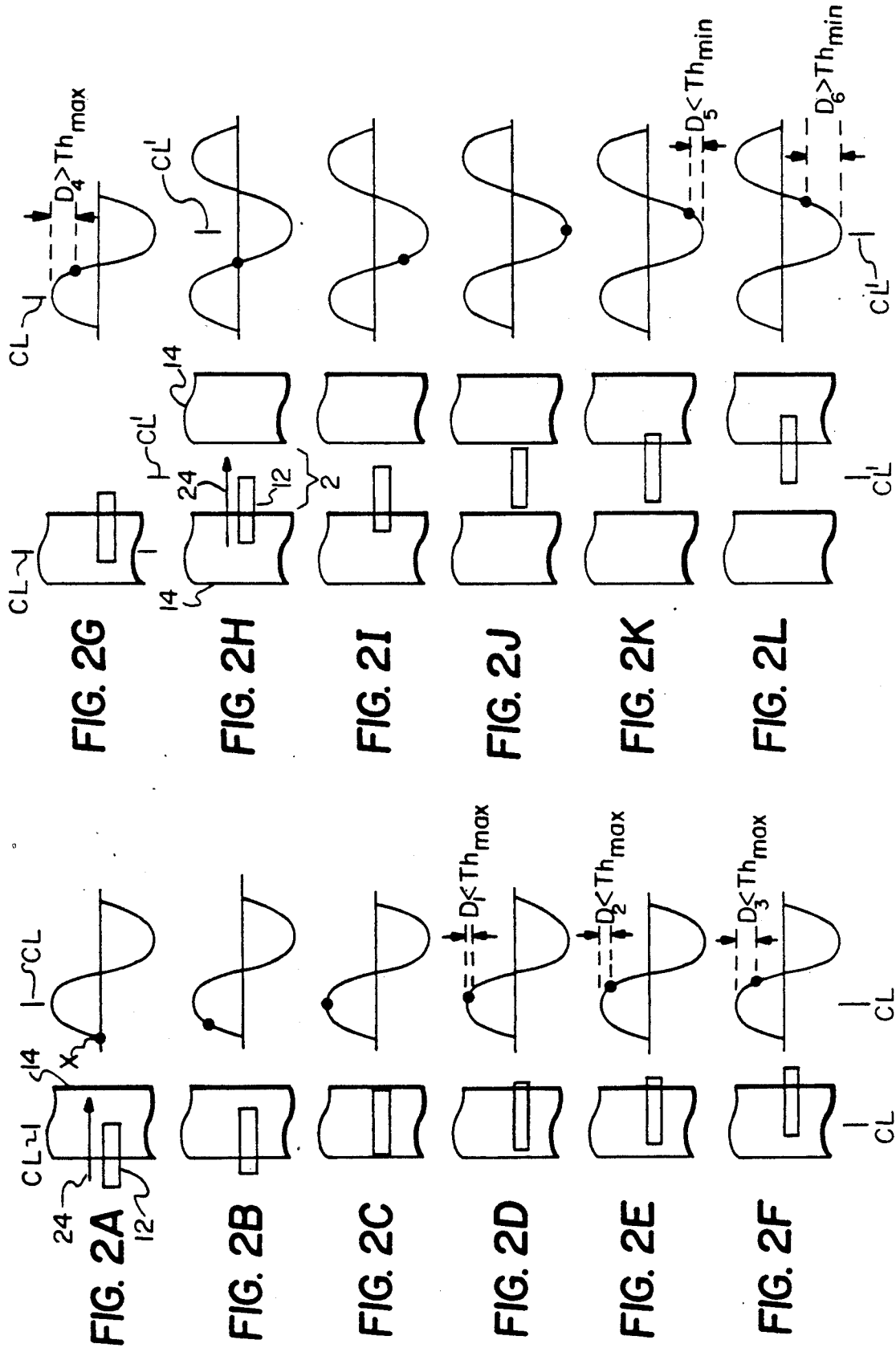

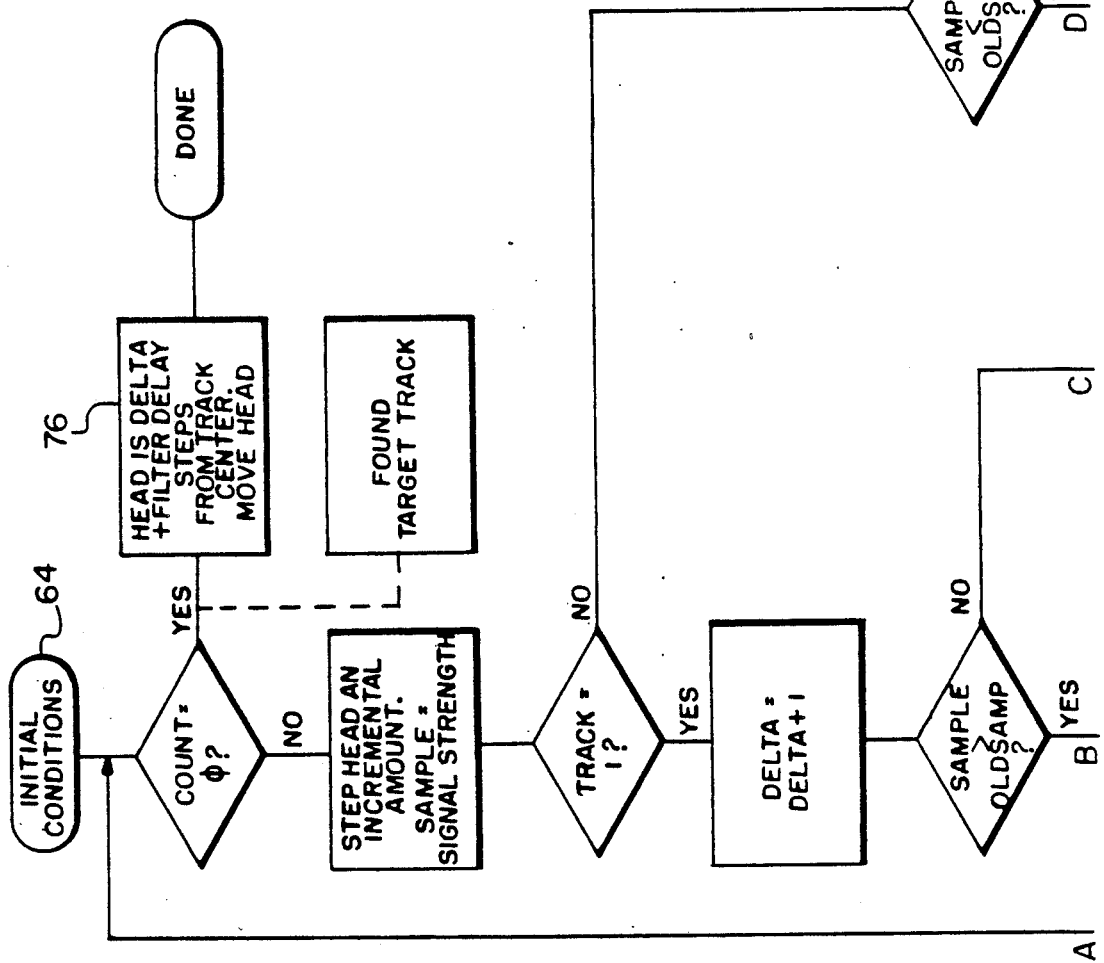

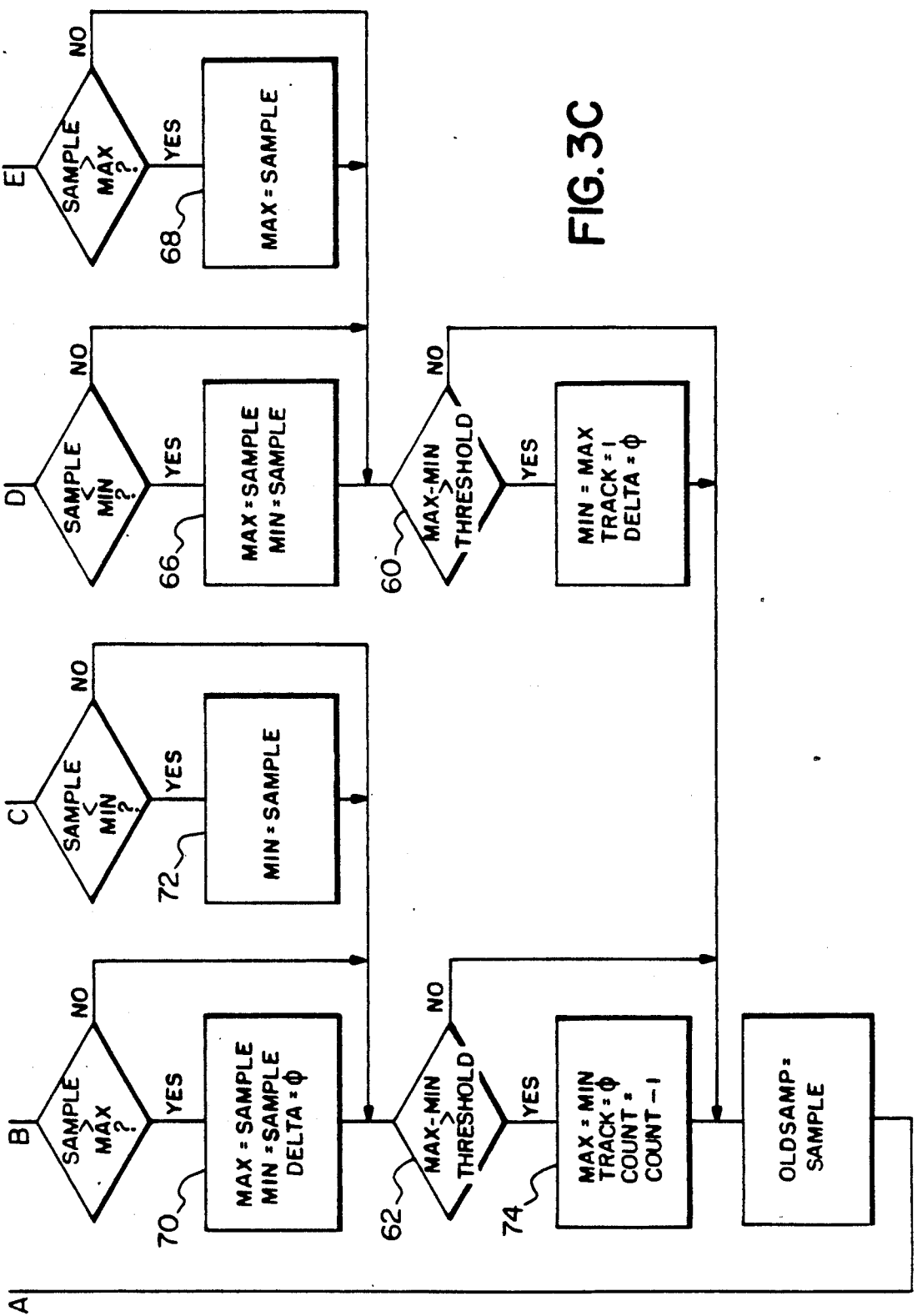

METHOD AND APPARATUS FOR CENTERING A TRANSDUCER OVER A RECORDED TRACK ON A ROTARY STORAGE MEDIUM

BACKGROUND OF THE INVENTION

1. Field of the Invention

This invention generally relates to information recording and reproduction apparatus and, more especially, to apparatus for finding the center of an information-bearing track without the use of auxiliary tracking heads or servo tracks.

2. Description Relative to the Prior Art

In order to recover information recorded on a circular track on a rotary storage medium, it is important to center a playback head on the part of the track producing the greatest signal strength. This is ordinarily the center of the track, where the signal envelope corresponds to maximum signal amplitude. Finding the center based on amplitude measurement is difficult for a number of reasons: interference between tracks produces anomalous amplitude readings, different signal levels from medium to medium and player to player necessitate dealing with a variety of signal levels, and the signal drop from outer to inner tracks on the same medium complicates the interpretation of signal levels.

U.S. Pat. 4,204,234 describes a track-following servo in which a playback head follows a path defined by the maximum amplitude data signals. The crest or maximum amplitude signal is found by the analysis of a regular sequence of digitized amplitude samples. The track center is found by observing that the present sample (third sample, in time) is less than the previous sample (second sample), which in turn was greater than the one prior to it (first sample). A position error signal is calculated from these amplitude samples and input to the servo to direct the head backwards toward the track center. In a further aspect of this technique, a fourth amplitude sample strengthens the criteria for crest detection if it is less than the third sample. This track-following technique is intended for following an existing, known track where a signal crest is assured. Its reliance on the amplitude value of adjacent samples, however, is susceptible to anomalous signal levels characteristic of unknown tracks and unknown media, a situation such as encountered when a medium is first put into a player.

It is known to base a tracking decision upon a threshold related to the expected signal level. U.S. Pat. 4,689,700 describes a thresholding technique in which track center is found by determining the positions where the envelope signal strength passes a fixed threshold on both its upward and downward slopes. Track center is then calculated to be midway between the two points. Since average signal strength drops from outer to inner tracks and a fixed threshold could miss a track, the '700 patent allows for varying the threshold level depending on the position of the track. This technique, however, is based on implicit foreknowledge of the expected signal. Noisy signal levels or unusual signal levels, which are dependent on the vagaries of the recording environment, will still lead to erroneous estimation of track centers.

SUMMARY OF THE INVENTION

The invention incorporates a thresholding technique that operates substantially independent of absolute signal level and thus does not depend on implicit foreknowledge of the recorded signal. After tentatively flagging an amplitude change, e.g., from increasing to decreasing, as a signal maximum, a threshold is applied to the signal excursion after the tentative signal maximum. The threshold, while representing a fixed amplitude difference, is tied to a signal peak rather than to a specific signal level. If the signal amplitude drops through this amplitude difference, then the tentative signal maximum is validated as a real track center rather than just some perturbation in the signal.

In practicing the invention, an amplitude signal is generated as a transducer is moved radially across a rotating storage medium. A signal maximum is discriminated by comparing samples of the amplitude signal. The amplitude sample representative of the signal maximum is retained. Each succeeding amplitude sample is subtracted from the retained sample until the amplitude difference exceeds a predetermined "excursion" threshold. Passing this threshold "validates" the signal maximum as a true track center. Meanwhile, according to a further aspect of the invention, the increments of transducer movement past the position of signal maximum are counted. The accumulated count at the point of signal validation is retained. The transducer is then moved in a reverse radial direction through a distance corresponding to the retained count until it substantially overlies the center of the track.

BRIEF DESCRIPTION OF THE DRAWINGS

The invention will be described with reference to the drawings, in which:

FIGS. 2(A) through 2(L) show a series of illustrations comparing head location with amplitude signal waveforms;

FIGS. 3(A) through 3(C) include a flow chart showing operation of the tracking apparatus of FIG. 1 according to the invention and FIG. 3(B) shows an amplitude-signal waveform helpful in understanding the flow chart.

DETAILED DESCRIPTION OF THE INVENTION

Because players are well known for reproducing information from circular tracks on a storage medium, the present description will be directed in particular to elements forming part of, or cooperating more directly with, tracking apparatus in accordance with the present invention. Player elements not specifically shown or described herein may be selected from those known in the art.

Figure 1:
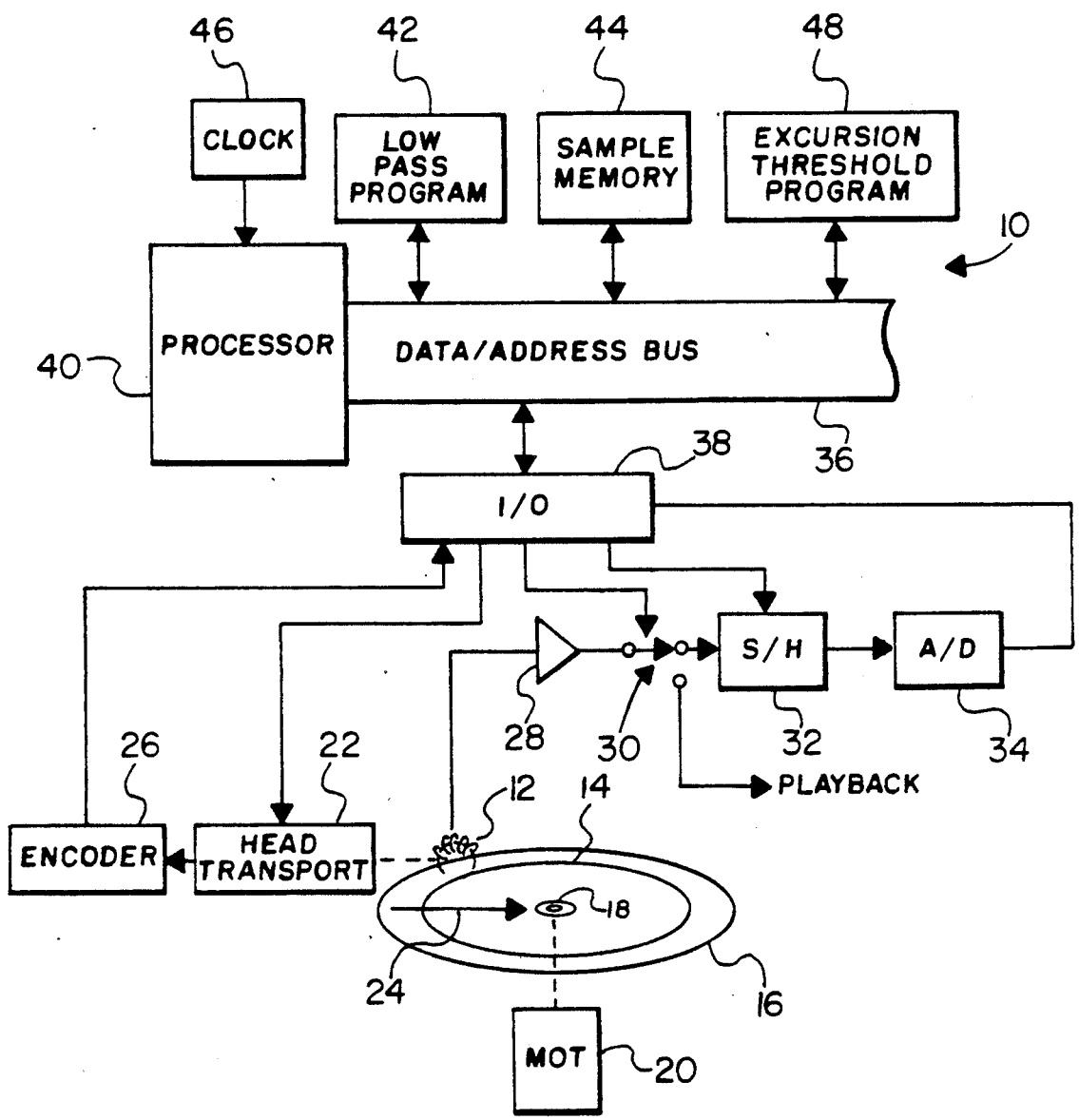
FIG. 1 is a block diagram of tracking apparatus used according to the invention in connection with a magnetic disk player.

Referring first to FIG. 1, tracking apparatus 10 is shown for centering a transducer head 12 over an information-bearing track 14 on an information-bearing storage medium 16. While the invention may be employed with various forms of storage such as optical or magnetic, and with various media configurations such as disk or drum, the preferred embodiment is implemented in combination with a magnetic disk and magnetic playback equipment. The track 14 is one magnetic track of a plurality of such tracks (others not shown) that are formed concentrically with respect to a central hub 18 in the disk 16. The hub 18 supports the disk 16 for rotation by attachment with a motor 20, which for a typical video application would rotate the disk 16 at 60 Hz. During track access, the head 12 is driven by a head transport 22 along a radial path 24 extending from the outermost track to the innermost track on the disk 16. The radial movement of the head 12 is registered in even increments by an encoder 26 attached to the head transport 22.

A repetitive, generally sinusoidal amplitude signal is generated as the head moves across the plurality of tracks (as represented by the track 14). The head transport 22 moves the head 12 across the tracks at a rate that yields an amplitude signal frequency that is less than the frequency of disk rotation (60 Hz). The amplitude signal is boosted by an amplifier 28 and applied either to the tracking apparatus 10 or to a playback circuit (not shown) via a switch 30. With the switch 30 connecting the head output to the tracking apparatus 10, the amplitude signal is sampled by a sample/hold circuit 32 and the sample output is digitized by an analog/digital converter 34. The digitized amplitude samples are applied to a data/address bus 36 through an input/output unit 38. A processor 40, such as a programmed microprocessor, implements the track centering procedure. The processor 40 first applies the amplitude samples to a low pass filter defined in software and stored in a low pass program memory 42. The low pass filter has a cutoff frequency somewhat above the frequency at which the head 12 should pass over tracks but below the period of rotation of the disk 16. This cutoff frequency helps to eliminate noise, intertrack interference, and the effects of eccentrically recorded tracks.

The output of the low pass filter essentially represents a sine wave at the frequency at which the head encounters tracks. In the preferred embodiment, the head movement is such that signal peaks occur at about 30 Hz and the low pass filter is set up to cut off at about 50 Hz. The filtered amplitude samples are stored in a sample memory 44, from which they are accessed for subsequent processing. The processor 40, by means of a clock oscillator 46, controls the sampling frequency of the sample/hold circuit 32. The processor 40 also directs movement of the transducer head 12 through the I/O unit 38 and controls the switch 30 to select either a track access mode or a playback mode. The encoder 26 supplies position signals to the processor 40 through the I/O unit 38. These position signals represent increments of transducer movement relative to the path 24.

The filtered amplitude samples are retrieved from the sample memory 44 and processed according to the invention by an excursion threshold program, which is shown as being stored in a program memory 48. The excursion threshold software detects when the output of the low pass filter changes from an increasing slope to a decreasing slope. The position of the head 12, as provided by the encoder 26, is noted at this point. When the output of the filter has fallen a certain amount (the excursion threshold $Th_{max}$) then the software "validates" the track as being real and not just a perturbation in the signal.

This procedure is shown by relative head movement in the first series of illustrations A-G in FIG. 2. FIG. 2(A) shows the head 12 just straddling the edge of the track 14. The companion sinusoidal waveform represents a typical filtered waveform of the amplitude signal as the head traverses the track 14. The level x is the level of the filter output for the head position at that point relative to the track 14. As the signal level just crosses the signal axis in FIG. 2(A) the head 12 is moving onto the track 14. As the head 14 moves into and over the center line CL in FIG. 2(B and C) the signal rises toward the signal maximum as shown by FIG. 2(C). With the next sample (FIG. 2(D)) showing a decrease, it can be surmised that the prior sample (FIG. 2(C)) was a signal maximum. But whether it actually was track center remains to be confirmed. First the signal value for the potential signal maximum (FIG. 2(C)) is saved. The disk position of the potential signal maximum, as provided by the encoder 26, is also saved. Then each subsequent signal value is subtracted from the saved signal maximum value until the excursion threshold $Th_{max}$ is exceeded and the tentative identification of a signal maximum in FIG. 2(C) can be "validated". Because the position at "validation" is known relative to the position at track center, the head 12 can be moved backwards to locate over track center. (Since there is some phase shift or delay in the low pass filter, an amount corresponding to this delay is added to the physical count from the encoder 26 to correctly reposition the head 12.)

The procedure used to locate a signal maximum and then "validate" track center can also be used to locate a signal minimum and consequently "validate" the center of the area dividing a pair of tracks (which may be a guard band or simply a region of lessened signal strength). This is shown diagrammatically in FIG. 2(H-L) as the head 12 moves radially off the track 14, across a guard band g, and onto an adjacent track 14'. When the head 12 straddles the center line CL' of the guard band g, the amplitude signal is located at a signal minimum as shown by FIG. 2(J). Another excursion threshold $Th_{min}$ is used to determine when the signal level rises far enough (FIG. 2(L)) to be confident that the signal minimum actually represents the center line separating the tracks 14 and 14'. Counting transitions from signal peaks (center line of recorded tracks) to signal valleys (the center line of the guard band between tracks) is helpful in moving the head from a track to another track several tracks away. As long as the number of recorded tracks between the current track and the desired track is known, the desired track can be found without depending on tracks being recorded at specific physical locations. In the latter case, a "validated" signal valley will be between two recorded tracks but not necessarily equidistant between them. Since there is no need to center the head precisely in a signal valley, but only to recognize its passage as the head moves, the counts from the encoder 26 are not used to reposition the head.

FIGS. 3(A) and 3(C) show a flow chart summarizing an implementation of the track validation and centering technique embodied in the excursion threshold program. The program variables are defined as follows:

COUNT = track difference between the current and the sought-after track.
DELTA = counts from the encoder 26.
TRACK = 1, means head is on track. = 0, means head is off track.
SAMPLE = present value of amplitude signal.
OLDSAMPLE = previous value of amplitude signal.
THRESHOLD = both excursion thresholds, in this case $Th_{max} = Th_{min}$.
MAX = signal maximum, as used in the threshold equation.
MIN = signal minimum, as used in the threshold equation.

The threshold equation is seen in decision blocks 60 and 62 for signal minimum (valley) and signal maximum (peak), respectively. Initial conditions (block 64) are established by specifying the COUNT for the number of tracks to be crossed (including the one sought) and either saving MAX, MIN, OLDSAMPLE, DELTA, and TRACK from the previous track access or by averaging a number of samples taken at the starting head location to obtain the initial value of these variables. The program strategy is to have both MAX and MIN decline simultaneously (block 66) in a region a of the waveform (FIG. 3(B)) when SAMPLE<OLDSAMPLE. At point b (FIG. 3(B)), MIN is fixed and MAX begins to rise (block 68) through region c (FIG. 3(B)) until the excursion threshold $Th_{min}$ is exceeded (block 60). A signal valley has now been "validated". Then, in region d (FIG. 3(B)) both MAX and MIN rise (block 70) until a signal maximum (point e, FIG. 3(B)) is reached and MAX is fixed. Thereafter, in region f (FIG. 3(B)), MIN falls (block 72) with MAX remaining constant until the excursion threshold $Th_{max}$ is exceeded (block 62). Then COUNT is decremented by one (block 74) and the loop is repeated as the head continues to move radially across the tracks. When COUNT is decremented to zero, the program exits the main loop and the head is moved backwards DELTA increments plus the filter delay (block 76) until it is centered over the desired track.

If track center is determined by measuring the amplitude signal generated by a playback head, then the head must be returned to track center because the procedure of finding and validating track center takes the head away from the center. In practical terms, this means reversing the motion of the head and travelling past the center in the opposite direction, and then reversing the motion of the head again and finally approaching the center in the same direction as it was initially approached. Such overtravel and return is desirable because it eliminates problems due to "lost motion" or backlash in the gear train driving the head transport. FIG. 4 illustrates an additional embodiment of the invention which avoids reversing the motion of the head during the track validation and centering procedure.

Figure 4A:
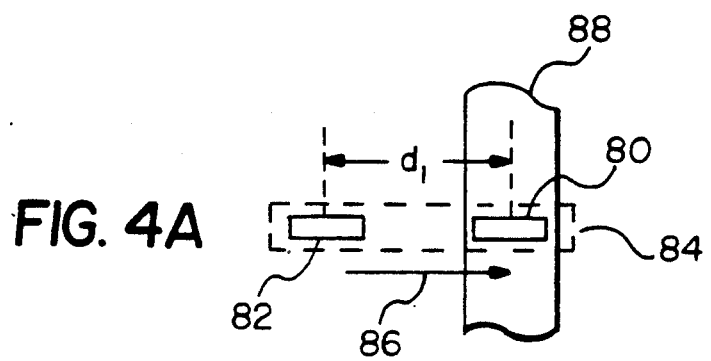
FIGS. 4(A) through 4(C) are illustrations useful in describing another embodiment of the invention.
Figure 4B:
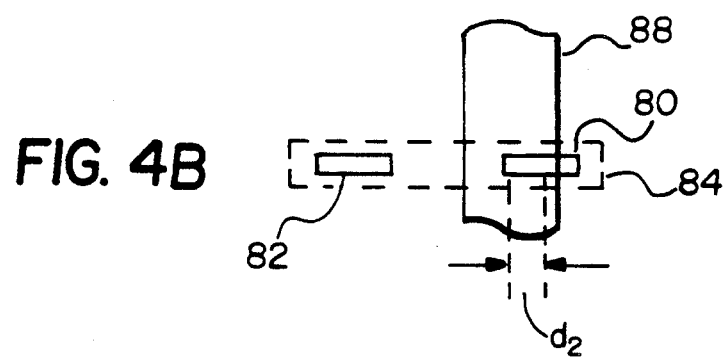
Figure 4C:
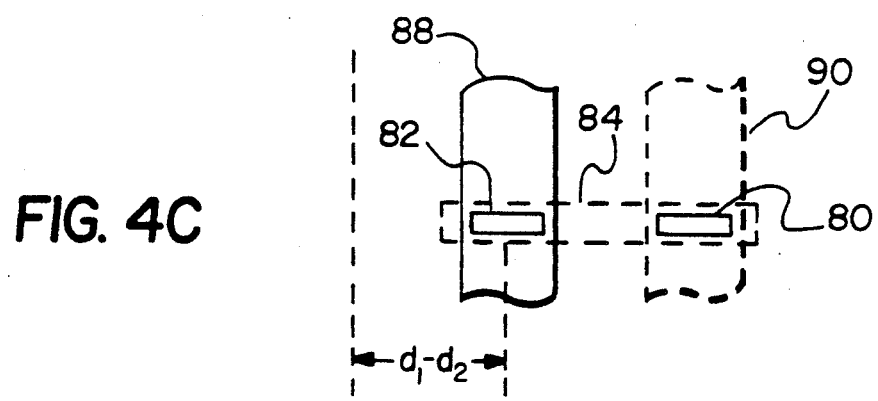

In FIGS. 4(A) through 4(C) two heads are provided: a leading head 80 and a trailing head 82. The heads 80 and 82 are mounted in a block 84 that separates them by a predetermined fixed distance $d_1$. During track centering, the block 84 moves radially in relation to the disk in a direction specified by the arrow 86. The lending head 80 is used as in the preceding embodiment to locate a signal maximum and then "validate" track center (or to locate a signal minimum and then "validate" a guard band). Initially, the block 84 is moved across a track 88 (FIG. 4(A)) just as in the prior procedure (FIG. 3(A)). When the excursion threshold $Th_{max}$ is exceeded and the track is "validated", the leading head 80 has moved a distance $d_2$ past the center of the track 88 (FIG. 4(B)). Then, instead of reversing the motion of the heads, the block 84 continues to move in the direction 86 through a distance $d_1-d_2$ (i.e., DELTA=$d_1-d_2$ increments) until the trailing head 82 is centered over the track 88. In this way, the track-finding motion is always in one direction and problems related to "backlash" are avoided.

The embodiment illustrated by FIGS. 4(A) through 4(C) are especially useful if there is a second track 90 located a distance $d_1$ (measured center-to-center) from the first track 88 (FIG. 4(C)). Then each head is centered over a respective track as a result of one track centering operation. The embodiment of FIGS. 4(A) through 4(C) are the preferred implementation in that the invention is applied to a still video system that records, and plays back, a still video frame comprising separate fields recorded on concentric tracks on a disk. Since the same heads are used for recording as for playback, the head separation $d_1$ determines track separation thereby providing the benefits of dual entering as shown by FIG. 4(C).

The invention has been described in detail with particular reference to a presently preferred embodiment, but it will be understood that variations and modifications can be effected within the spirit and scope of the invention.

What is claimed is:

1. A method for determining the approximate center of a prerecorded track on a rotary medium, said method comprising the steps of:

moving a transducer radially in relation to the medium whereby an amplitude signal is generated at an output of the transducer as it traverses one or more prerecorded tracks on the medium;

sampling the amplitude signal generated by the moving transducer;

comparing amplitude samples to find a signal maximum;

retaining the amplitude sample representative of the signal maximum;

subtracting one or more amplitude samples succeeding the signal maximum from the retained amplitude sample; and validating the signal maximum as track center when the difference between an amplitude sample and the retained sample exceeds a predetermined threshold.

2. The method as claimed in claim 1 further comprising the steps of:

counting and accumulating increments of transducer movement after the signal maximum is found;

retaining the accumulated count when the signal maximum is validated as track center; and moving the transducer in an opposite radial direction in response to the retained count until the transducer overlies the approximate center of the prerecorded track producing the signal maximum.

3. The method as claimed in claim 1 in which said step of moving a transducer further comprises moving a pair of transducers radially in relation to the medium whereby an amplitude signal is generated at an output of a leading transducer as it traverses one or more prerecorded tracks on the medium, said method further comprising the steps of:

counting and accumulating increments of transducer movement after the signal maximum is found;

retaining the accumulated count when the signal maximum is validated as track center; and moving the pair of transducers in response to the retained count until the trailing transducer overlies the approximate center of the prerecorded track producing the signal maximum.

4. A method for centering a magnetic head over a selected, information-bearing track on a magnetic disk, said method comprising the steps of:

rotating the disk at a predetermined angular frequency;

moving the head radially in relation to the rotating disk whereby an amplitude signal is generated at an output of the head as it traverses one or more tracks on the disk;

sampling the amplitude signal generated by the moving head;

low pass filtering the sampled amplitude signal;

comparing filtered amplitude samples to find a signal maximum;

retaining the amplitude sample representative of the signal maximum;

generating a difference between an amplitude signal succeeding the signal maximum and the retained amplitude sample;

confirming the signal maximum as track center when the difference exceeds a predetermined threshold; and positioning the head over track center by returning the head to the position providing the signal maximum.

5. The method as claimed in claim 4 in which the step of positioning the head over track center comprises:

counting and accumulating increments of head movement after the signal maximum is found;

retaining the accumulated count when the signal maximum is confirmed as track center; and moving the head in an opposite radial direction in response to the retained count and the low pass filter delay until the head overlies the approximate center of the selected track.

6. The method as claimed in claim 4 in which the step of low pass filtering is effective below a cutoff frequency that in turn is below the predetermined angular frequency of the rotating disk.

7. A method for centering a selected one of a pair of magnetic heads over a selected, information-bearing track on a magnetic disk, said pair of heads comprising a leading head separated by a predetermined fixed distance from a trailing head, said method comprising the steps of:

rotating the disk at a predetermined angular frequency;

moving the pair of heads radially in relation to the rotating disk whereby an amplitude signal is generated at an output of the leading head as it traverses one or more tracks on the disk;

sampling the amplitude signal generated by the leading head;

low pass filtering the sampled amplitude signal;

comparing filtered amplitude samples to find a signal maximum;

retaining the amplitude sample representative of the signal maximum;

generating a difference between an amplitude signal succeeding the signal maximum and the retained amplitude sample;

confirming the signal maximum as track center when the difference exceeds a predetermined threshold; and positioning the pair of heads relative to track center by moving the trailing head to the position providing the signal maximum.

8. The method as claimed in claim 7 in which the step of positioning the trailing head over track center comprises:

counting and accumulating increments of leading head movement after the signal maximum is found;

retaining the accumulated count when the signal maximum is confirmed as track center; and moving the pair of heads in the same radial direction in response to the retained count, the predetermined head separation and the low pass filter delay until the trailing head overlies the approximate center of the selected track.

9. The method as claimed in claim 7 in which the step of low pass filtering is effective below a cutoff frequency that in turn is below the predetermined angular frequency of the rotating disk.

10. Apparatus for centering a transducer over an information-bearing track on a recording medium mounted for rotation in relation to the transducer, said apparatus comprising:

means for radially moving the transducer across the rotating medium thereby generating an amplitude signal as the transducer passes over the information-bearing track;

means responsive to the relative levels of two instantaneous values of the amplitude signal for distinguishing a peak amplitude value corresponding to a peak in the amplitude signal waveform;

means for generating a difference signal representative of the differences between said peak value and one or more instantaneous values subsequent to said two instantaneous values;

means for generating a validation signal in response to the difference signal exceeding a predetermined threshold; and means responsive to the validation signal for repositioning the transducer over the information-bearing track.

11. Apparatus as claimed in claim 10 further including means for measuring the distance of transducer movement between the position producing the peak value and the position producing the validation signal, and in which said means responsive to the validation signal is also responsive to said measuring means for repositioning the transducer over the information-bearing track.

12. Apparatus as claimed in claim 10 in which said two instantaneous values are consecutive instantaneous values.

13. Apparatus for positioning transducer means relative to an information-bearing track on a recording medium mounted for rotation in relation to the transducer means, said transducer means including first and second transducers radially separated in relation to the rotating medium by a predetermined fixed distance, said apparatus comprising:

means for radially moving the transducer means across the rotating medium whereby said first transducer leads the second transducer across the medium thereby generating an amplitude signal as the first transducer passes over the information-bearing track;

means responsive to the relative levels of two instantaneous values of the amplitude signal for distinguishing a peak amplitude value corresponding to a peak in the amplitude signal waveform;

means for generating a difference signal representative of the differences between said peak value and one or more instantaneous values subsequent to said two instantaneous values;

means for generating a validation signal in response to the difference signal exceeding a predetermined threshold; and means responsive to the validation signal for positioning said transducer means relative to the information-bearing track whereby said second transducer is centered over the information-bearing track.

14. Apparatus as claimed in claim 13 further including means for measuring the distance of transducer movement between the position producing the peak value and the position producing the validation signal, and in which said means responsive to the validation signal is also responsive to said measuring means and the predetermined separation distance of the transducers for continuing transducer movement in the same direction until the second transducer is centered over the information-bearing track.

15. Apparatus as claimed in claim 13 in which said two instantaneous values are consecutive instantaneous values.

* * * * *